Figure 1:
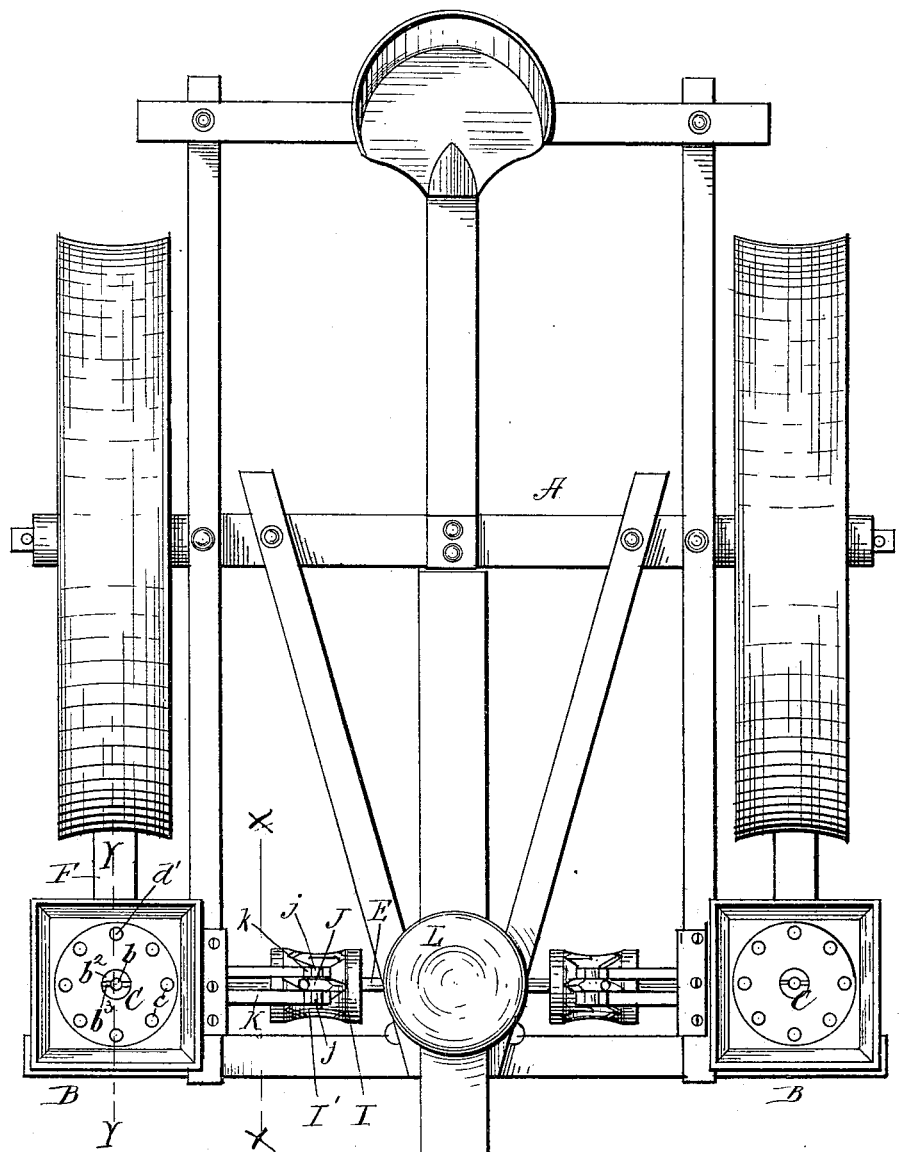

(No Model.) 3 Sheets—Sheet 1.

O. J. COLTON.
CORN PLANTER.

No. 349,836. Patented Sept. 28, 1886.

Witnesses
W. C. Corliss
O. E. Reuneno.

Inventor
Octavius J Colton
By Coburn & Thacher
Attorneys (No Model.) 3 Sheets—Sheet 2.
O. J. COLTON.
CORN PLANTER.
No. 349,836. Patented Sept. 28, 1886.
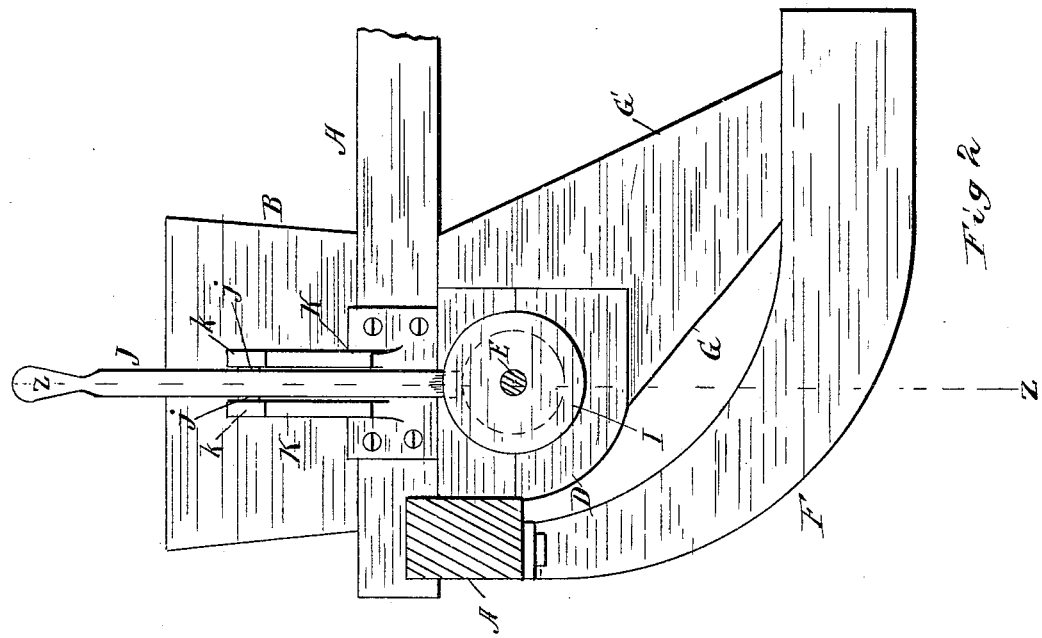
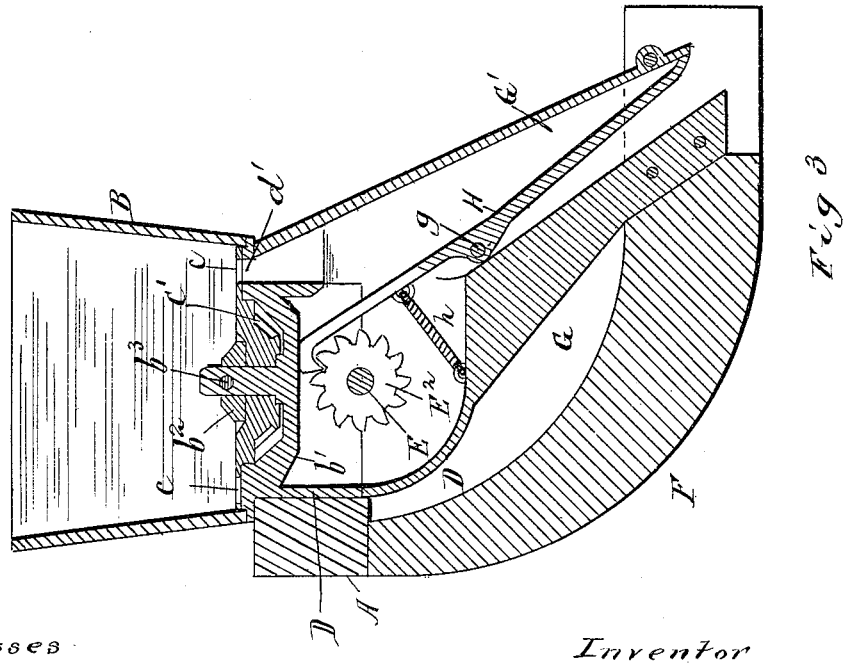
Witnesses
Inventor
Octavius J Colton (No Model.) 3 Sheets—Sheet 3.
O. J. COLTON.
CORN PLANTER.
No. 349,836. Patented Sept. 28, 1886.
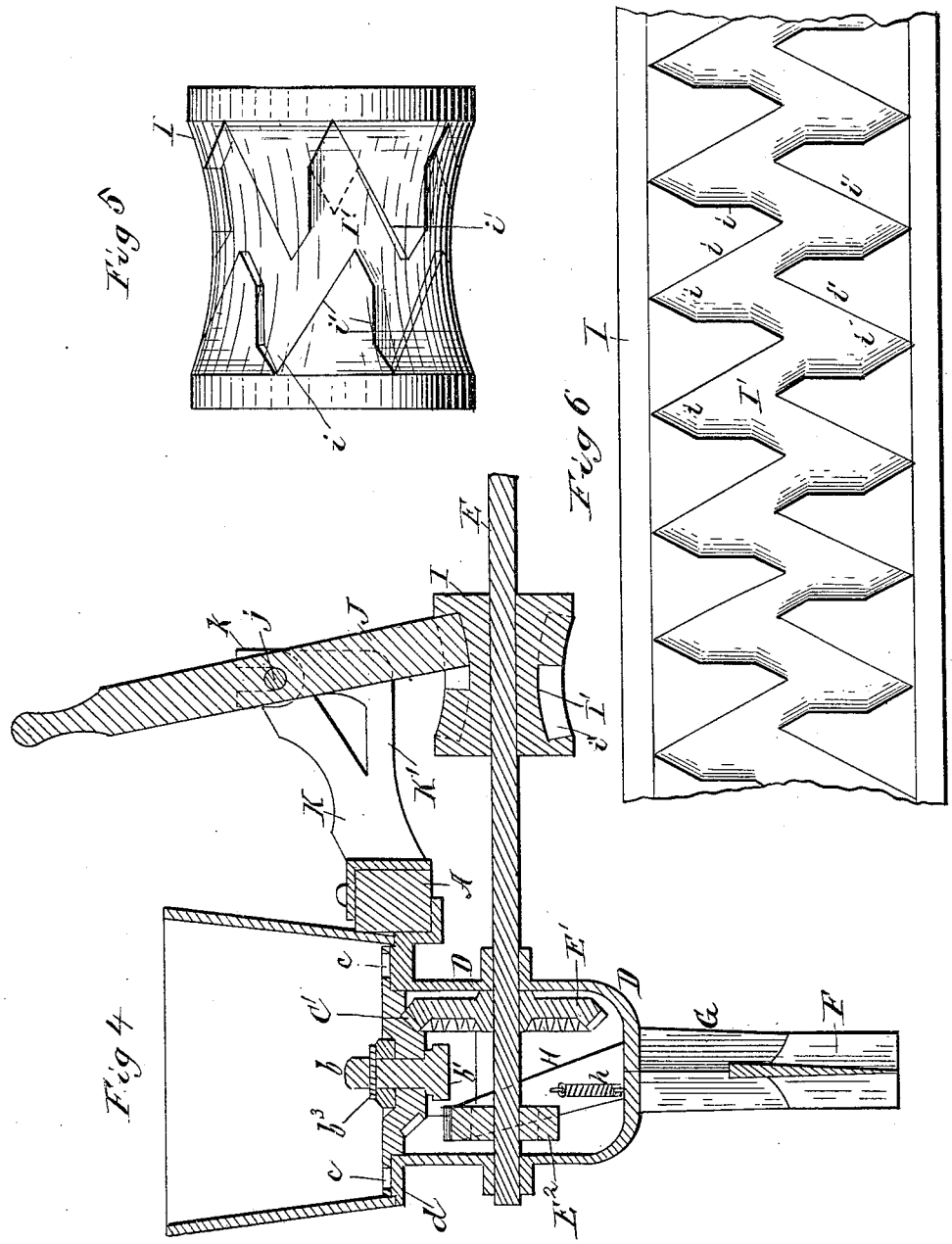
Witnesses
Inventor
Octavius J Colton
By Coburn & Thacher
Attorneys

UNITED STATES PATENT OFFICE.

OCTAVIUS J. COLTON, OF GALESBURG, ILLINOIS, ASSIGNOR TO G. D. COLTON & COMPANY, OF SAME PLACE.

CORN-PLANTER.

SPECIFICATION forming part of Letters Patent No. 349,836, dated September 28, 1886.

Application filed February 9, 1885. Serial No. 155,417. (No model.)

*To all whom it may concern:*

Be it known that I, OCTAVIUS J. COLTON, a citizen of the United States, and residing at Galesburg, in the county of Knox and State of Illinois, have invented certain new and useful Improvements in Corn-Planters, which are fully set forth in the following specification, reference being had to the accompanying drawings, in which—

Figure 1 is a plan view of a corn-planter embodying my invention; Fig. 2, a sectional view of the same on the line $x\ x$ of Fig. 1; Fig. 3, a similar sectional view on the line $y\ y$ of Fig. 1; Fig. 4, a sectional view on the line $z\ z$ of Fig. 2; Fig. 5, a plan view of the cam-grooved wheel detached, and on an enlarged scale; and Fig. 6, a diagram illustrating the construction of the cam-groove therein.

Like letters refer to like parts in all the figures of the drawings.

My invention relates to corn-planters, and more particularly to the seed-dropping mechanism thereof, and to the means for operating the same; and it consists in certain novel features, which I will now proceed to describe, and then specifically point out in the claims.

In the drawings I have shown in Fig. 1 my improvements applied to a corn-planter frame of the character set forth in Letters Patent No. 313,466, granted to A. Anderson, March 10, 1885, to which patent reference is made for a description of the said frame, no detailed description thereof being necessary in the present instance, since the frame forms no part of my present invention, and any approved form of frame may be employed, although I prefer the form shown therein.

On the frame A are mounted at each side thereof, at or near the front end, seed-boxes B, these boxes being of the description commonly used in corn-planters, and being attached to the frame in any suitable manner. These boxes and the seed-dropping mechanism connected to each one of them are two in number, and being similar in their nature, the construction of only one of them will be described here, it being understood that the said description is equally applicable to the other.

The bottom of the seed-box is formed by a revolving plate, C, which is mounted on a pivot, $b$, attached to a cross-piece, $b'$, as shown in Figs. 3 and 4 of the drawings, the said plate C being retained in position by means of a washer, $b^2$, fitting over the projecting end of the pivot $b$, and provided with a groove in its upper surface, in which sets a pin, $b^3$, passing through the pivot. By reason of this construction the washer holds the plate C down in position, and is at the same time prevented itself from rotating with the plate. The outer edge of the plate C is provided with a series of perforations, $c$, extending through the same, as shown, these perforations being shown, in the present instance, as eight in number, although any desired number may be employed. The portion of the heads of the disks containing these perforations rests upon a ledge or flange, $d$, forming a portion of the bottom of the box, this ledge or flange being shown, in the present instance, as formed in one piece with the upper part of the casing D, arranged below the bottom of the box and supporting the same.

In suitable bearings in the casing D is mounted one end of the intermittently-rotating shaft E, the said shaft carrying within the casing D a bevel or miter gear, E', secured on the shaft, and meshing with the corresponding bevel or miter gear, C', formed on the under side of the plate C. By this means the movement of intermittent rotation imparted to the shaft E by suitable mechanism is transmitted to the plate C. The flange $d$ closes the lower end of the perforations $c$ in the plate C, except at one point, shown in the present instance as being at the rear portion of the flange, where an orifice, $d'$, is formed through the flange for the purpose of establishing a communication between the seed-box and the remaining portion of the dropping mechanism when one of the apertures $c$ coincides with the said orifice $d'$.

F indicates a runner, of the usual construction, attached to the frame at its upper end, and bifurcated at its lower end, so as to form a furrow to receive the corn. To this lower end of the runner is attached the leg G, the upper end of which forms the lower portion of the casing D. In this leg is formed a seed tube or passage, G', extending from the orifice $d'$ to the runner F, and by means of which the corn is conducted from the said orifice into the furrow formed by the runner. Within this seed-tube is arranged a vibrating lever or "flipper," H, pivoted to the leg G at $g$, the lower end of the said flipper being normally held by means of a spring, $h$, so as to close the lower end of the seed-tube, while the upper end is arranged in the path of the teeth of a ratchet-wheel, $E^2$, mounted on the shaft E within the casing D, as clearly shown in Figs. 3 and 4 of the drawings. The number of teeth on the ratchet-wheel $E^2$ corresponds with the number of openings $c$ in the plate C, which register with the orifice $d'$ during one entire revolution of the shaft E, bearing the same proportion to the number of openings in said plate that the gear E′ does to the gear C′, the said ratchet-wheel having twelve teeth in the present instance, and the ratchet-wheel is so arranged as to open the lower end of the seed-tube by reason of one of its teeth coming in contact with the upper end of the flipper H after the corn has dropped from one of the openings $c$ and has lodged at the lower end of the said seed-tube, and after the corn has dropped into the furrow to allow the said end of the seed-tube to be closed again by means of the spring $h$ operating upon the flipper H just before the corn drops from the next opening $c$. It will be observed that the upper end of the flipper H, being held in contact with the radial side of the teeth of the ratchet-wheel $E^2$, will prevent the seed-wheel and the shaft E from being rotated in the wrong direction.

In practice the seed-box B will be provided with the usual false bottom above the rotating plate C, in order to cause the corn therein to fall into the apertures $c$, and a suitable cut-off will also be provided above the orifice $d'$, so as to prevent the passage of any more corn through the orifice $d'$ than the quantity contained in the aperture $c$ which may be immediately above it.

From the above description the operation of my device will be readily understood. The intermittent rotary motion of the shaft E is transmitted through the gears E′ and C′ to the plate C, thereby bringing the several apertures $c$ successively over the orifice $d'$. As each aperture registers with the orifice, the corn contained therein is dropped through the orifice into the seed-tube, at the lower end of which it is held by the flipper H. The flipper, actuated by the spring $h$, closes the lower end of the seed-tube while the corn is dropped into it, as just described, and at the next stroke of the operating mechanism the flipper H, actuated by the ratchet-wheel $E^2$, opens the lower end of the seed-tube and allows the corn contained therein to fall into the furrow formed by the runner F.

In order to impart to the shaft E the intermittent rotary motion necessary to properly actuate the seed-dropping mechanism, I have devised the mechanism shown in detail in Figs. 4, 5, and 6 of the drawings. On the shaft E, near each end thereof, is mounted a wheel, I, provided with a cam-groove, I′, in its periphery, constructed as hereinafter described. In this cam-groove is arranged the lower end of a lever, J, provided with pivot pins or projections $j$, by means of which it is pivotally mounted in a bracket, K, attached to the frame of the machine, the said bracket being provided with open bearings $k$, to receive the said pivot-pins $j$, and also with guides K′, arranged on each side of the lever J, to guide the said lever and cause it to move steadily without any lateral deviation. The cam-groove I′ is constructed substantially as shown in the diagram illustrated in Fig. 6, extending in a zigzag path around the whole periphery of the wheel, thus forming a series of inclines, the number of which corresponds with the number of times it is intended to have the seed-dropping devices actuated during an entire revolution of the shaft E, twelve inclines being shown in the present instance, corresponding with the number of teeth in the ratchet-wheel $E^2$, and bearing the same proportion to the number of orifices $c$ in the plate C that the said ratchet-wheel bears. The lower end of the lever J is diamond or lozenge shape in cross-section, as shown in dotted lines in Fig. 5 of the drawings, the inclination of the sides thereof corresponding to the inclination of the side of the cam-groove I′, and at the end of each incline of the said groove is a pocket, $i$, formed by an extension of the incline and adapted to receive the end of the lever at the end of each stroke thereof. The lever is arranged to vibrate in the plane of the shaft E, and the periphery of the wheel I and the groove I′ therein is constructed upon a curve drawn from the fulcrum of the lever J as a center. It will be seen from this construction that upon each stroke of the lever J in either direction the lower end thereof, starting from one of the pockets $i$, moves freely in the cam-groove I′ until it strikes the side $i'$ of the groove which is opposite the said pocket, when the wheel I and shaft E, to which it is attached, by reason of the contact of the said lever with the inclined edge of the groove, are caused to rotate until the end of the lever lodges in the pocket $i$, toward which it is moving. When the lever has reached the end of its stroke, it comes in contact with the walls of the pocket, and thereby stops the rotation of the wheel I and shaft E, which parts will remain stationary until upon the movement of the lever in the opposite direction it comes in contact with the next inclined wall, $i$, of the groove I′, when the wheel and shaft will be again rotated, as before. It will thus be seen that by the continuous vibration of the lever J an intermittent rotary motion will be imparted to the shaft E, and thence through the mechanism hereinbefore described to the seed-dropping devices. It will be observed that when the lever is in one of the pockets $i$ at the end of its stroke it forms a stop which prevents any accidental rotation of the shaft E, and it will also be seen that during the movement of the lever from the pocket to its point of contact with the inclined wall $i'$ any motion of the seeding devices is prevented by reason of the engagement of the upper end of the flipper H with the teeth of the ratchet-wheel $E^2$, as hereinbefore pointed out. The wheel I and bracket K are arranged in duplicate on each side of the machine, a seat, L, being placed between the two, so that the person occupying the seat may face either way at right angles to the path of the machine and use the lever J on either side, the lever being readily removable by reason of the bearings $k$, in which it is mounted, being open at the top, as hereinbefore described.

It is obvious that various mechanical modifications in the construction and application of my device may be made without departing from the principle of my invention. For instance, my improved seed-dropping mechanism described herein may be used in conjunction with other mechanism for the purpose of imparting an intermittent rotary motion to its operating-shaft—such, for instance, as the check-row mechanism for which I have made application for Letters Patent of even date herewith. Moreover, I do not wish to be understood as limiting myself strictly to the precise details of construction hereinbefore set forth, and shown in the drawings, as various mechanical modifications may be made therein which may fairly be considered as coming within the scope of my invention.

Having thus described my invention, what I claim as new, and desire to secure by Letters Patent, is—

The combination, with the revolving horizontal plates C, each having apertures $c$ and an orifice, $d'$, with which the said apertures successively register, each of the said plates being provided with a bevel-gear, C', of the shaft E, having bevel-gears E', to mesh with the gears C' on the plates C, and provided with wheel I, having a cam-groove formed in its periphery, and a vibrating lever, J, adapted to engage with the said cam-groove to impart an intermittent rotary motion to the said shaft E and revolving plates C, said lever being mounted in brackets between the guides K', which hold it in its proper plane of vibration, substantially as and for the purposes specified.

OCTAVIUS J. COLTON.

Witnesses:
IRVINE MILLER,
JNO. C. MACGREGOR.